(No Model.) 2 Sheets—Sheet 1.

P. JOHNSON.
GATE.

No. 482,640. Patented Sept. 13, 1892.

Witnesses
H. L. Amey
N. W. Riley

Inventor
Peter Johnson,
By his Attorneys,
C. A. Snow & Co.

(No Model.) 2 Sheets—Sheet 2.

P. JOHNSON.
GATE.

No. 482,640. Patented Sept. 13, 1892.

Witnesses
H. L. Amer
H. J. Riley

Inventor
Peter Johnson.
By his Attorneys,
C. A. Snow & Co.

UNITED STATES PATENT OFFICE.

PETER JOHNSON, OF CAMBRIDGE, ILLINOIS.

GATE.

SPECIFICATION forming part of Letters Patent No. 482,640, dated September 13, 1892.

Application filed May 3, 1892. Serial No. 431,719. (No model.)

*To all whom it may concern:*

Be it known that I, PETER JOHNSON, a citizen of the United States, residing at Cambridge, in the county of Henry and State of Illinois, have invented a new and useful Gate, of which the following is a specification.

The invention relates to improvements in swinging gates.

The object of the present invention is to simplify and improve the construction of swinging gates and to enable the same to be readily operated without necessitating dismounting or leaving a vehicle.

The invention consists in the construction and novel combination and arrangement of parts hereinafter fully described, illustrated in the accompanying drawings, and pointed out in the claims hereto appended.

Figure 1:
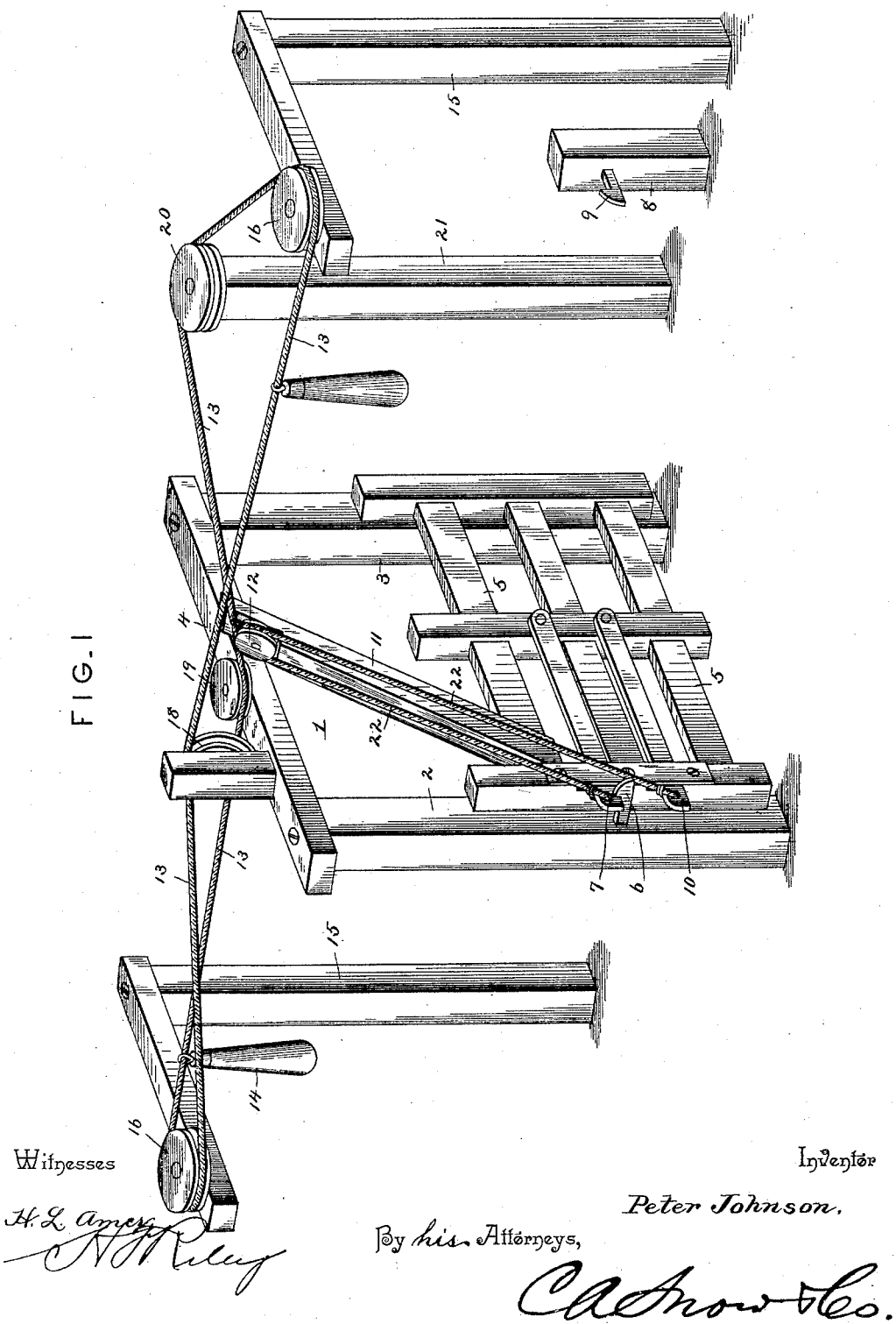
Figure 2:
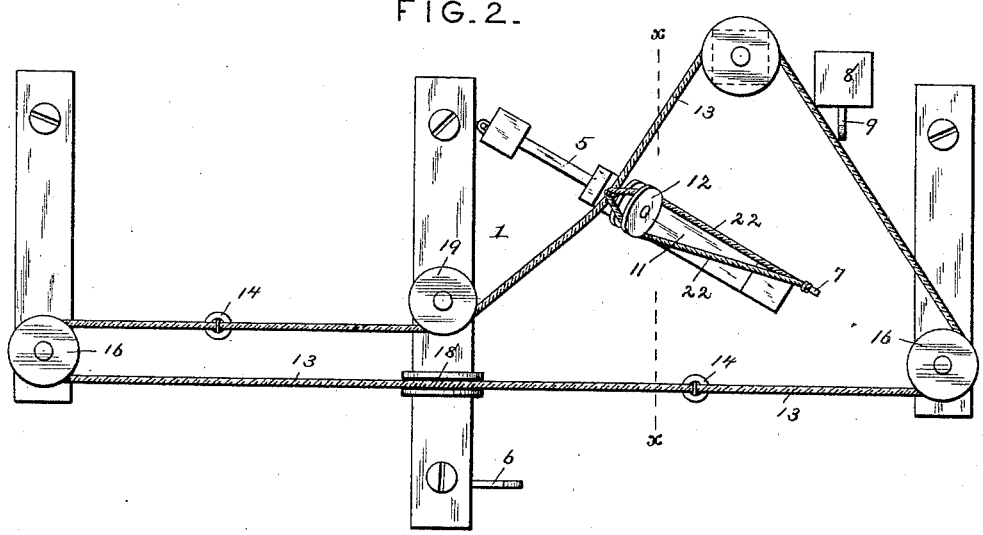
Figure 3:
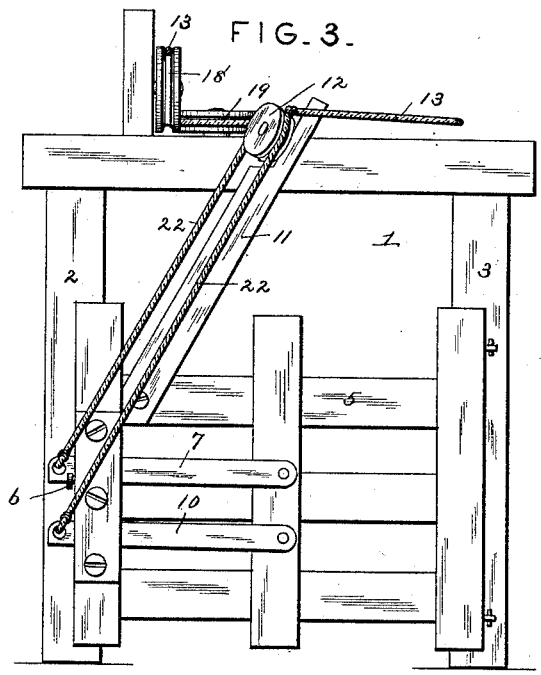

In the drawings, Figure 1 is a perspective view of a gate constructed in accordance with this invention. Fig. 2 is a plan view. Fig. 3 is a vertical sectional view on the line $x\ x$ of Fig. 2, the gate being closed.

Like numerals of reference indicate corresponding parts in all the figures of the drawings.

1 designates a frame composed of uprights 2 and 3 and a top bar 4, connecting the upper ends of the uprights and extending across a gateway. A gate 5 is hinged to the upright 3, and the upright 2 is provided with a keeper 6, arranged to be engaged by a latch 7 of the gate. The gate opens in one direction only, and when open is held in that position by a supplemental latch-post 8, provided with a keeper 9, arranged to be engaged by a lower latch 10. Extending from the top of the gate from the front end thereof is an inclined bar 11, which is provided at its upper end with a pulley 12, and which is connected with an endless operating-rope 13, having handles 14 depending from it and adapted to open and close the gate. The endless operating-rope 13 is supported by uprights 15, arranged a suitable distance from each side of the gate and having pulleys 16, around which the operating-rope passes, and the said rope passes over a vertical pulley 18 and a horizontal pulley 19 of the frame and around a pulley 20, mounted on the upper end of an upright 21, arranged adjacent to the supplemental latch-post. The operating-rope passes from the horizontal pulley 19 to the pulley 20 of the upright 21, and the movement of the rope causes the gate to swing between these pulleys and to open and close. The pulleys 16 are arranged at the ends of horizontal arms of the uprights 15, and the said arms extend inward over the roadway to bring the depending handles within convenient reach of the operator. One handle is arranged on one side of the rope and the other handle is arranged on the other side of the rope, and when a handle is moved toward the frame the gate is opened. After passing through the gateway the person takes hold of the adjacent handle and moves it away from the gate, thereby closing the latter. The latches are operated by ropes 22, each having one end connected to a latch and its other end attached to the operating-rope, and the latch-ropes are arranged on opposite sides of the pulley 12 at the upper end of the inclined bar 11. The latch-ropes are arranged so that the upper one will be raised preparatory to opening the gate and the lower one will be operated preparatory to closing the gate.

It will be seen that the gate is simple and comparatively inexpensive in construction and that it may be readily operated from a vehicle or on horseback.

What I claim is—

1. The combination of a frame, a gate hinged to the frame and provided with latches, an inclined bar extending upward and rearward from the front of the gate and provided at its upper end with a pulley, the uprights 15, arranged on opposite sides of the gate, the upright 21, arranged to have the gate open adjacent to it, pulleys mounted on the uprights and the frame, an endless operating-rope passing around the pulleys and provided with depending handles, and the latch-ropes extending along the inclined bar and having their lower ends connected with the latches and their upper ends secured to the endless rope and disposed on opposite sides of the pulley at the upper end of the inclined bar, substantially as described.

2. The combination of a frame, a gate hinged to the frame, the uprights 15, arranged at opposite sides of the gate and having horizontal arms extending inward and carrying pulleys, the upright 21, arranged in the direction in which the gate swings and provided at its top with a pulley, the horizontal and vertical pulleys mounted on the frame, and the endless operating-rope passing around the pulleys and connected with the gate, substantially as described.

3. The combination of a frame, a gate hinged to the frame and provided with upper and lower latches, a keeper mounted on the frame and adapted to be engaged by one of the latches, a supplemental latch-post having a keeper adapted to be engaged by the other latch, an inclined bar extending upward from the gate and provided at its upper end with a pulley, the uprights 15 and 21, the pulleys mounted on the frame and the uprights, an endless operating-rope passing around the pulleys, and latch-ropes having their lower ends connected to the latch and their upper ends arranged on opposite sides of the pulley of the inclined bar and secured to the operating-rope, substantially as described.

In testimony that I claim the foregoing as my own I have hereto affixed my signature in the presence of two witnesses.

PETER JOHNSON.

Witnesses:
  J. W. HOXBY,
  W. M. SMITH.